J. M. SHAFER.
WEEDING MACHINE.
APPLICATION FILED DEC. 7, 1912.
1,074,217.
Patented Sept. 30, 1913.
2 SHEETS—SHEET 1.
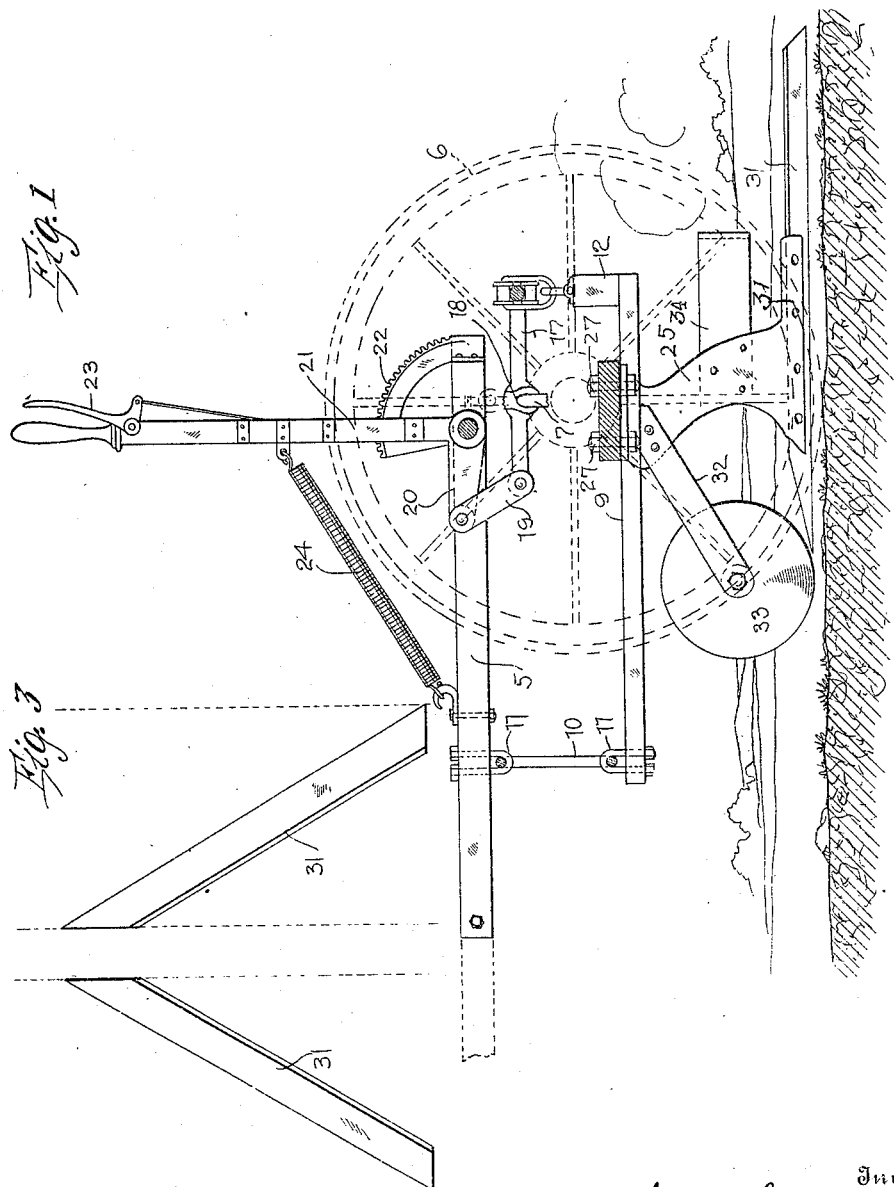

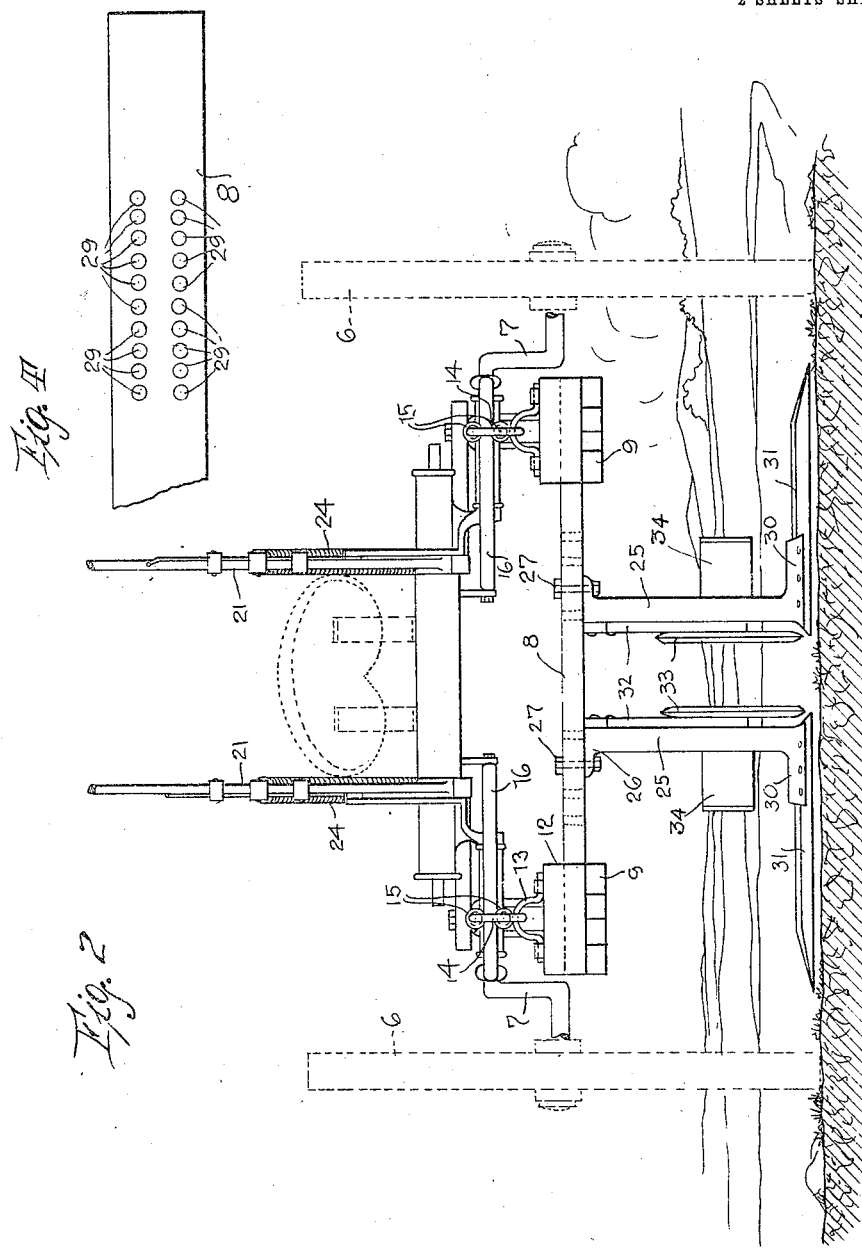

UNITED STATES PATENT OFFICE.

JOHN M. SHAFER, OF ROSEBUD, NEW MEXICO.

WEEDING-MACHINE.

1,074,217.   Specification of Letters Patent.   Patented Sept. 30, 1913.

Application filed December 7, 1912. Serial No. 735,422.

*To all whom it may concern:*

Be it known that I, JOHN M. SHAFER, a citizen of the United States, residing at Rosebud, in the county of Union and State of New Mexico, have invented new and useful Improvements in Weeding-Machines, of which the following is a specification.

The present invention relates to means for cutting weeds in spaces between rows of growing crops, and one of the primary objects is to provide a simple apparatus that can be employed with a wheeled cultivator frame, and will effectively destroy the weeds, being adjustable to accommodate the widths of the rows and the varying contour of the ground over which the device passes.

An embodiment of the invention is illustrated in the accompanying drawings, wherein:—

Figure 1 is a view partially in elevation and partially in section of the mechanism. Fig. 2 is a rear elevation of the same. Fig. 3 is a plan view, illustrating the relation of the weed-cutting blades. Fig. 4 is a detail plan view of one end portion of the supporting beam.

Similar reference numerals designate corresponding parts in all the figures of the drawings.

In the embodiment illustrated, a suitable frame 5 is employed, mounted on wheels indicated in dotted lines at 6, which wheels are rotatably journaled in suitable axles 7, carried by the frame. This portion of the mechanism may be of well known or ordinary construction, and it is believed, needs no further description.

The weeder mechanism proper includes a supporting beam 8, arranged transversely of the main frame 5 between the wheels 6, this beam having attached to its ends, forwardly extending bars 9, the front ends of which, in the present embodiment, being connected by links 10 and U-bolts 11 to the main frame. Any suitable form of connection may be employed, however, as will be obvious. The rear ends of the bars 9 have blocks 12 attached thereto, and these blocks are provided with bails 13, on which are mounted stirrups 14. The said stirrups 14 have journaled therein upper and lower rollers 15, which operate upon and along rods 16, located longitudinally of the beam 8, and being carried by arms 17 journaled, as shown at 18 on the axles 7. The front ends of these arms are connected by links 19 to the crank arms 20 of independently operating levers 21. These levers can be locked in any desired position by the usual dogs engaging racks 22, and operated by hand pieces 23. Springs 24 are employed to suitably counterbalance the weight of the mechanism supported by the said levers.

Suspended from intermediate portions of the beam 8, are independent standards 25, having offset ears 26 arranged beneath and against the beam, through which holding bolts 27 pass. These bolts can be placed in any of two sets of openings 29, so that the standards 25 can be adjusted toward and from each other, and secured in the desired adjusted relation. The standards 25 have at their lower ends, outwardly and rearwardly inclined feet 30, to which are riveted, or otherwise secured, outwardly and rearwardly inclined-weed-cutting blades 31, having their front edges sharpened. The standards furthermore are provided with forwardly extending, downwardly inclined arms 32, on the lower ends of which are journaled rolling colters 33 that operate just in advance of the front points of the cutter blades.

Secured to the outsides of the standards 25 above the blades 31 are rearwardly extending fenders 34, which extend outwardy and serve to prevent clods, lumps, and the like from falling over against the plants in the row. The inclination of the fenders is preferably less than that of the blades.

With this apparatus, when it is desired to cut the weeds between rows of growing plants, the standards 25 are adjusted toward or from each other, to the width of such rows, and it will be evident that the colters will be adjusted with them. The machine is then driven along the rows, with the standards on opposite sides of the same, and the colters will first cut lines being immediately followed by the blades 31, which cut the weeds without tearing up the surface of the ground into the rows. By operating the levers, the beam 8 can be raised and lowered, as desired, and either lever may be actuated independently of the other, so that the beam can be tilted, in order that either or both cutter blades can be adjusted to variations of the surface over which the machine passes. Experience has demonstrated that the apparatus is highly effective in operation, and by means of it, a large area can be rapidly covered.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In apparatus of the character set forth, the combination with a wheeled support, of a standard carried thereby, a supporting horizontal weed-cutting blade mounted on the lower end of the standard, and means for mounting a fender on the standard above the blade and arranged to prevent the material cut by the blade from falling on the row.

2. In apparatus of the character set forth, the combination with a wheeled support, of a depending standard carried thereby, a rearwardly extending outwardly inclined cutting blade carried by the lower end of the standard, and a rearwardly and outwardly inclined fender secured to the standard above the blade for turning the material cut by the blade away from the row.

3. In apparatus of the character set forth, the combination with a support, of spaced standards suspended from the support and adjustable thereon toward and from each other, and substantially horizontal weed cutting blades mounted on the lower ends of the support and extending outwardly and rearwardly at an inclination from each other, the front ends of said blades extending in advance of the standards and said blades being adjustable toward and from each other upon the adjustment of the standards.

4. In apparatus of the character set forth, the combination with a support, of spaced standards suspended from the support and adjustable thereon toward and from each other, substantially horizontal weed cutting blades mounted on the lower ends of the support and extending outwardly and rearwardly at an inclination from each other, the front ends of said blades extending in advance of the standards and said blades being adjustable toward and from each other upon the adjustment of the standards, and a colter mounted on each standard and adjustable therewith and with the blade thereof, said colter coacting with the front end of the blade to cut the weeds that are cut by the front ends of said blades.

In testimony whereof I have hereunto set my hand in presence of two subscribing witnesses.

JOHN M. SHAFER.

Witnesses:
 WM. HOBSON,
 SAMUEL TABBS.